(12) United States Patent
Simeri et al.

(10) Patent No.: US 6,227,407 B1
(45) Date of Patent: May 8, 2001

(54) SMALL ARTICLE VENDING SYSTEM

(76) Inventors: Patrick J. Simeri, 10902 Ashland Way, Avondale, AZ (US) 85323; John Carl Walden, 2601 50th Ln., Phoenix, AZ (US) 85035

( * ) Notice: Subject to any disclaimer, the term of this patent is extended or adjusted under 35 U.S.C. 154(b) by 0 days.

(21) Appl. No.: 09/215,361

(22) Filed: Dec. 18, 1998

(51) Int. Cl.[7] .............................. A24F 15/04; G07F 11/16
(52) U.S. Cl. ......................... 221/254; 221/192; 221/195; 221/196
(58) Field of Search .................................... 221/254, 281, 221/192, 195, 196, 197

(56) References Cited

U.S. PATENT DOCUMENTS

| | | | |
|---|---|---|---|
| 774,615 | * 11/1904 | Tarner | 221/196 |
| 888,443 | * 5/1908 | Kent | 221/196 X |
| 1,996,472 | * 4/1935 | Hermann | 221/192 X |
| 5,318,200 | * 6/1994 | Allen et al. | 221/254 X |

* cited by examiner

*Primary Examiner*—Christopher P. Ellis
*Assistant Examiner*—Patrick Mackey
(74) *Attorney, Agent, or Firm*—Frank A. Lukasik

(57) ABSTRACT

A system for dispensing articles such as candy, lollipops, or other oddly shaped objects is provided. A helix, turned by an electric motor or the purchaser of the article, delivers a single unit from a loading area to one basket in a chain of baskets. The baskets are mounted on a belt that is part of a chute assembly, carried to the top of the chute, and rotated to dump the article onto a dispensing shelf from where gravity delivers it to the purchaser. By introduction of a coin, the lollipop machine will start, and, by way of the belt mechanism a product is carried up and over the top of the chute.

5 Claims, 6 Drawing Sheets

SMALL ARTICLE VENDING SYSTEM

BACKGROUND OF THE INVENTION

1. Field of the Invention

This invention relates to a system and apparatus for dispensing articles such as candy, lollipops or other oddly shaped objects which may be bulk loaded into an arcuate dish and thereafter agitated by a helix into individual pieces. Each piece is then dropped by gravity into a bucket at the bottom of a chute and thereafter carried to the top of the chute where it is dumped onto a dispensing shelf, dropping thereafter to and out of a discharge exit in sight of the purchaser. An independently operated coin mechanism causes a coin to follow a slide, by gravity, to a cash door, isolating the dispensing mechanism from the coin collection.

2. Description of the Prior Art

Heretofore, devices for dispensing objects by vending machines have been directed to loading individual objects into the machines and inseparably combining a dispensing mechanism and a coin operating mechanism, among other distinctions. The bulk loading capability of the present invention allows for efficient servicing of the machine by the operator as well as product delivery without 100% of the product being present in a hopper. For example, U.S. Pat. No. 5,732,852 to Baker et al discloses a vending machine that requires a plurality of platforms disposed about a helical path upon which articles to be vended are placed. Each article to be dispensed is placed individually and horizontally on its own platform, and once an appropriate coin is inserted into a coin slot a handle of the coin mechanism is enabled, i.e. allowed to rotate, causing a shaft of the latching mechanism to rotate. This causes a lip of a cam to release the particular platform, thereby dumping the article to drop via gravity to a recovery area. It can be seen that the foregoing actions do not teach, suggest or infer applicants system for elevating articles to the top of a chute and thereafter dumping them onto a dispensing plate for delivery by gravity to a recovery exit.

U.S. Pat. No. 5,738,245 to Tomioka concerns a double-layered automatic commodity vending machine wherein commodity capsules are placed in individual storage sections of a drum that is rotated through a predetermined angle with respect to a shaft and has a plurality of commodity-shaped discharge openings through which each commodity is selectively released to a collection area. It will be readily appreciated that the teachings of Tomioka fail to anticipate the patentable features of applicants invention. U.S. Pat. No. 5,728,999 to Teicher discloses a vending machine and operating system wherein articles are displayed on separate shelves according to size, shape and color and are dispensed in an entirely different manner than those in applicant's invention. Furthermore, Teicher is directed mainly to a system for payment by credit card and hence is further distinguished from applicant's invention.

U.S. Pat. No. 5,690,251 to Wade relates to a vending machine for dispensing panty hose which are placed on a plurality of elongated trays and released via a helix to a dispensing pan which is accessible to the purchaser. A money changer is provided which further distinguishes this invention from applicant's. U.S. Pat. No. 5,638,985 to Fitzgerald et al concerns a vending machine which includes plural rows of slots vertically stacked so that the slots in each row form vertical columns with slots in adjacent rows. A programmed microprocessor and drivers control the operation of the motive elements in the vending machine.

It can readily be appreciated that these references, either singly or in combination, are not concerned with and do not suggest or infer the vending system of the present invention for dispensing oddly shaped articles such as candy or lollipops wherein the articles may be introduced into an apparatus in bulk form and the coin mechanism operates independently of the dispensing mechanism.

SUMMARY OF THE INVENTION

Accordingly, it is an object of the invention to provide a system and apparatus for dispensing oddly shaped objects such as candy or lollipops wherein the objects may be introduced into the apparatus in bulk form.

It is another object of the invention to provide such a system and apparatus wherein the dispensing mechanism is distinct from the coin collection mechanism.

It is a further object of the invention to provide such a system and apparatus wherein objects may be dispensed without having to load a complete supply of the object product in the apparatus.

It is yet another object of the invention to provide such a system and apparatus wherein the object may be a candy formed on a stick such as a lollipop.

It is a still further object of the invention to provide such a system and apparatus wherein the objects to be dispensed may be viewed by the purchaser moving up and into a position for sale.

The foregoing objects are realized by the present invention in a system which includes a coin operated release mechanism and a separately operated dispensing apparatus. The dispensing apparatus comprises a basket and belt assembly that picks up candy from a holding area and raises it to a first chute assembly which brings it to the top of the machine. An electric motor actuates a mechanism that causes the basket to move up and dump the product and dump the product by gravity onto a first dispensing shelf and then a second dispensing shelf to deliver the product to a purchaser at the product exit. The coin a mechanism includes a money drawer so that when the drawer is removed, allows the money to be quickly and directly moved into a transport container.

DESCRIPTION OF THE DRAWINGS

The foregoing and further objects of the invention will become apparent from reading the following detailed description of preferred embodiments of the invention.

DETAILED DESCRIPTION OF THE INVENTION

Figure 3:
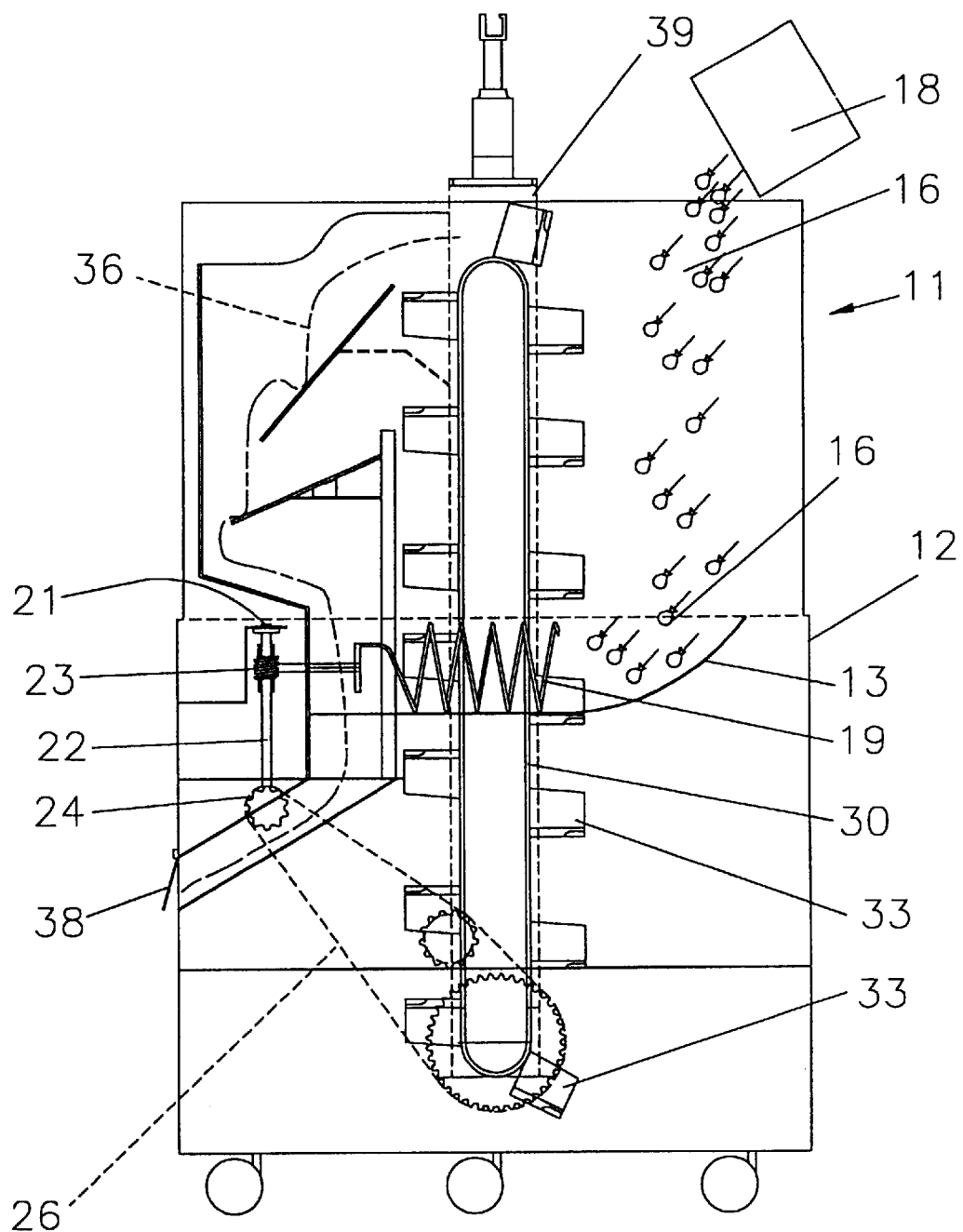
FIG. 3 is a sectional side elevation of the invention slightly reduced in size taken substantially along line B—B of FIG. 2 with the cover removed.

Turning now to the drawings, more particularly to FIG. 3, there is shown a dispensing system 11 that includes a dispenser housing 12 and a tray 13 for receiving a plurality of lollipops 16 that have been dumped thereinto from a container 18. Tray 13 is curved so as to direct the lollipops toward a helix 19 which is driven by a wheel 21, or an electric motor (not shown) connected by a shaft 22 to to a worm gear 23.

Figure 4:
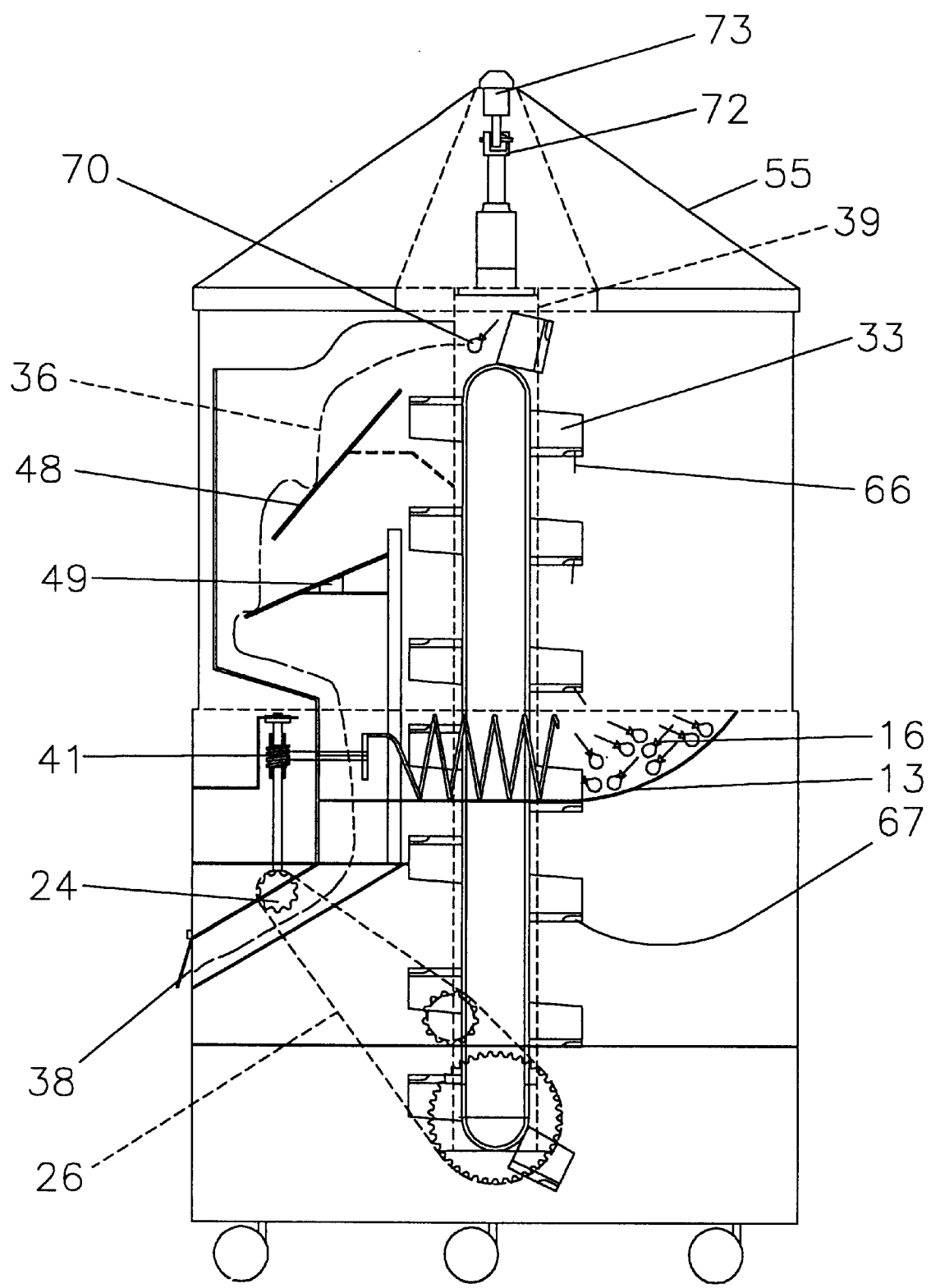
FIG. 4 is a substantial replica of the view of FIG. 3 with the cover in place and the product articles in position to be moved into the system.

Shaft 22 is also connected by conventional means (not shown) to a sprocket wheel 24 which operates a chain drive mechanism 26 for driving a conveyer belt 30 to which a plurality of baskets 33 are connected. Baskets 33 carry individual articles such as lollipops 16, as shown in FIG. 4, the baskets 33 being pivotally mounted on belt 30 to dump each lollipop along a path indicated by dashed line 36 to be carried by gravity to an exit door 38. The basket and belt assembly is mounted in a chute 39.

Figure 1:
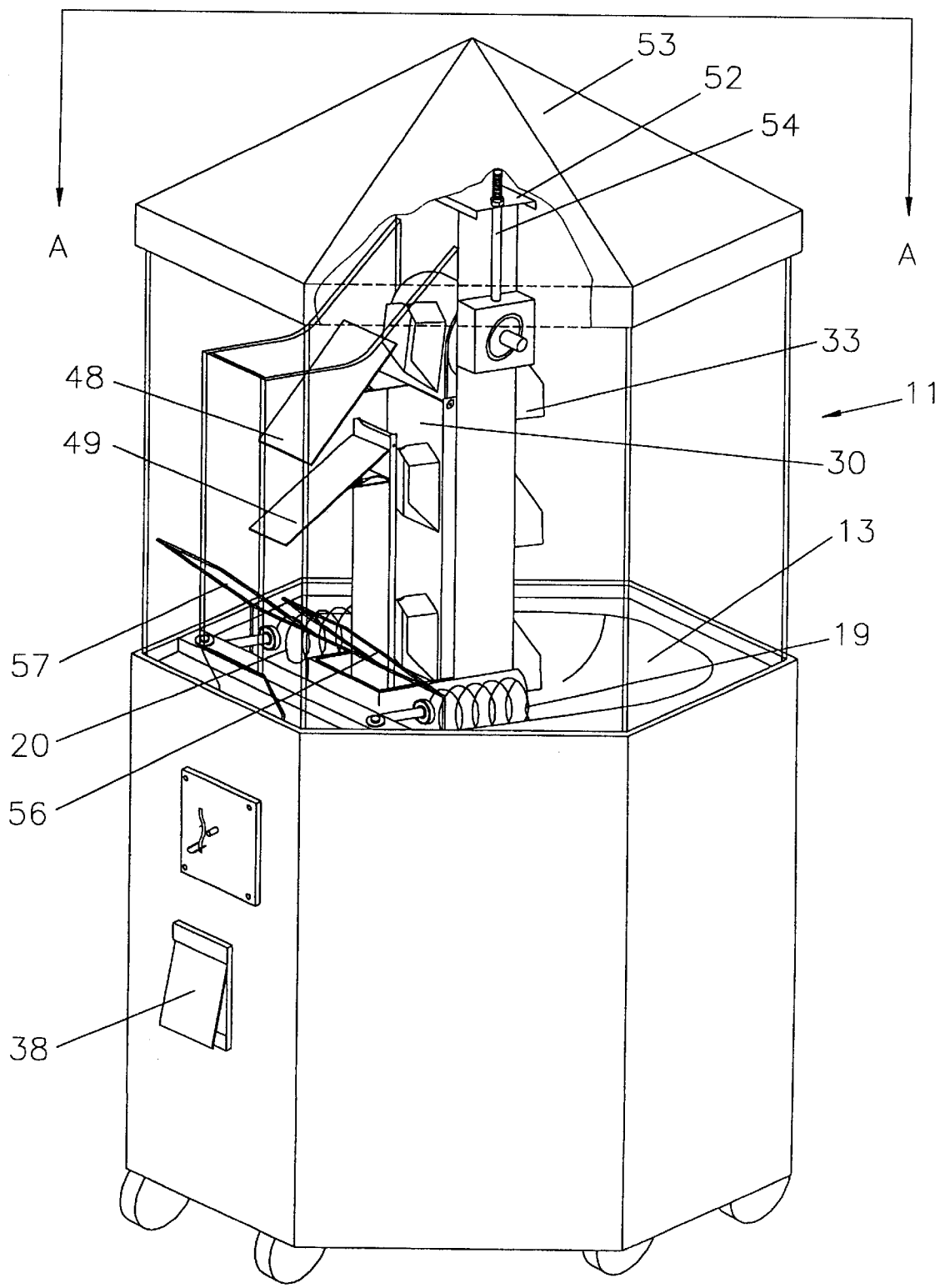
FIG. 1 is a perspective view of the invention partly in section showing the portion of the invention that may be viewed by the purchaser.
Figure 2:
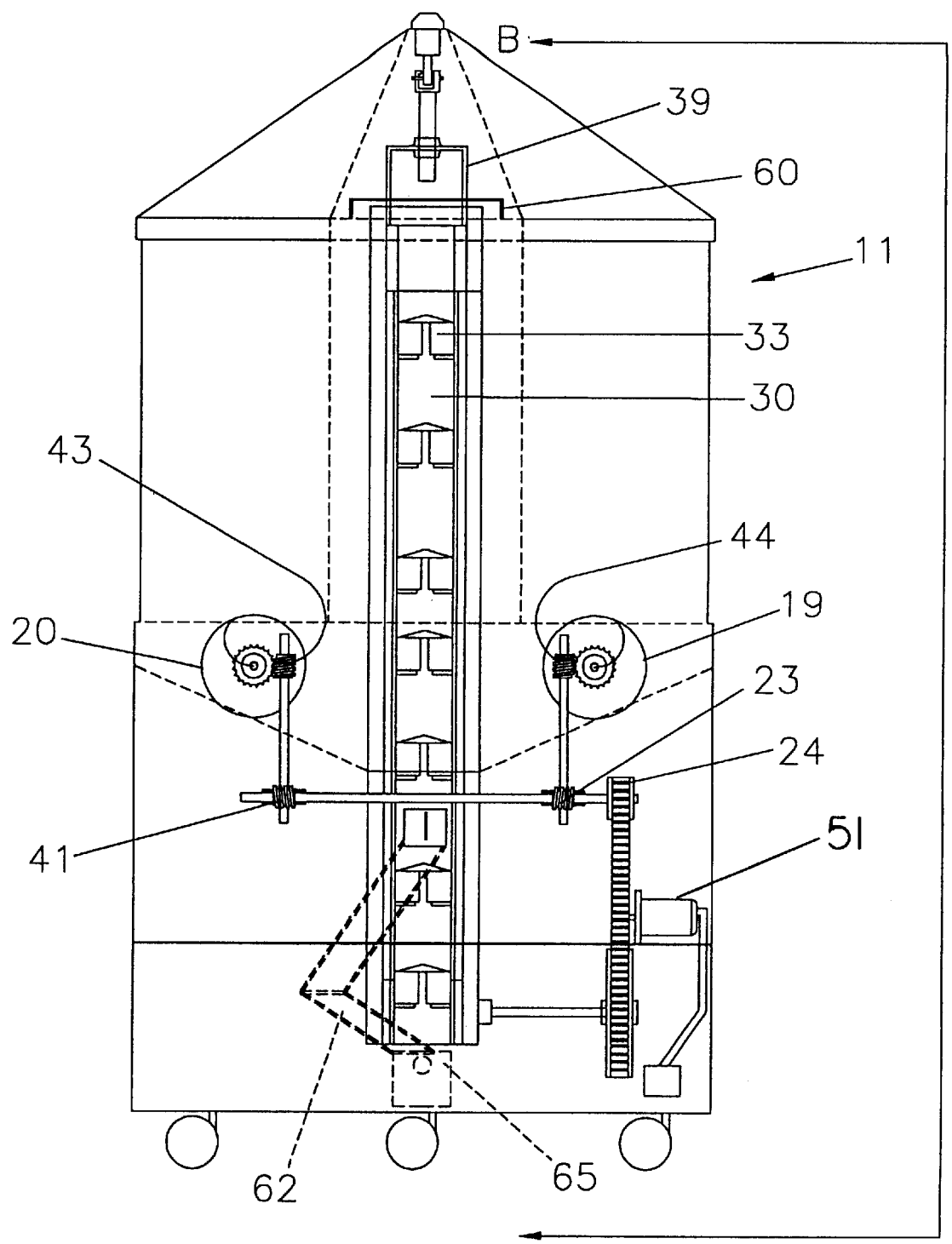
FIG. 2 is a sectional side elevation of the invention taken substantially along line A—A in FIG. 1.

FIGS. 1 and 2 show the invention in perspective, illustrating a second helix 20 which is rotated oppositely to helix 19 by a motor (not shown) or by a reverse-angled worm gear 41 to provide reciprocal motion of the helixes so that the purchaser may capture an article in either one of the helixes. Motion is transferred from wheel 24 to the helixes via worm gears 23 and 41. A set of dispensing plates 48 and 49 divert the lollipops or other articles clear of the mechanism beneath, while a crank 51 provides an external connection for operating mechanism 26. Also shown in FIG. 1 are a channel form 52 in which the mechanism is mounted, a hood 53, a form adjusting and tightening mechanism 54, and a pair of deflector plates 56 and 57, which may be operated independently of one another to intercept falling lollipops and return them to tray 13 when circumstances warrant this action. The deflector plates 56 and 57 are nested vertically against the adjacent ends of the helixes using conventional means, (not shown), after an appropriate sum of money has been inserted in the coin mechanism assembly. FIG. 2 shows a hood alignment bracket 60, a cash track 62, and a cash door 65.

Figure 5:
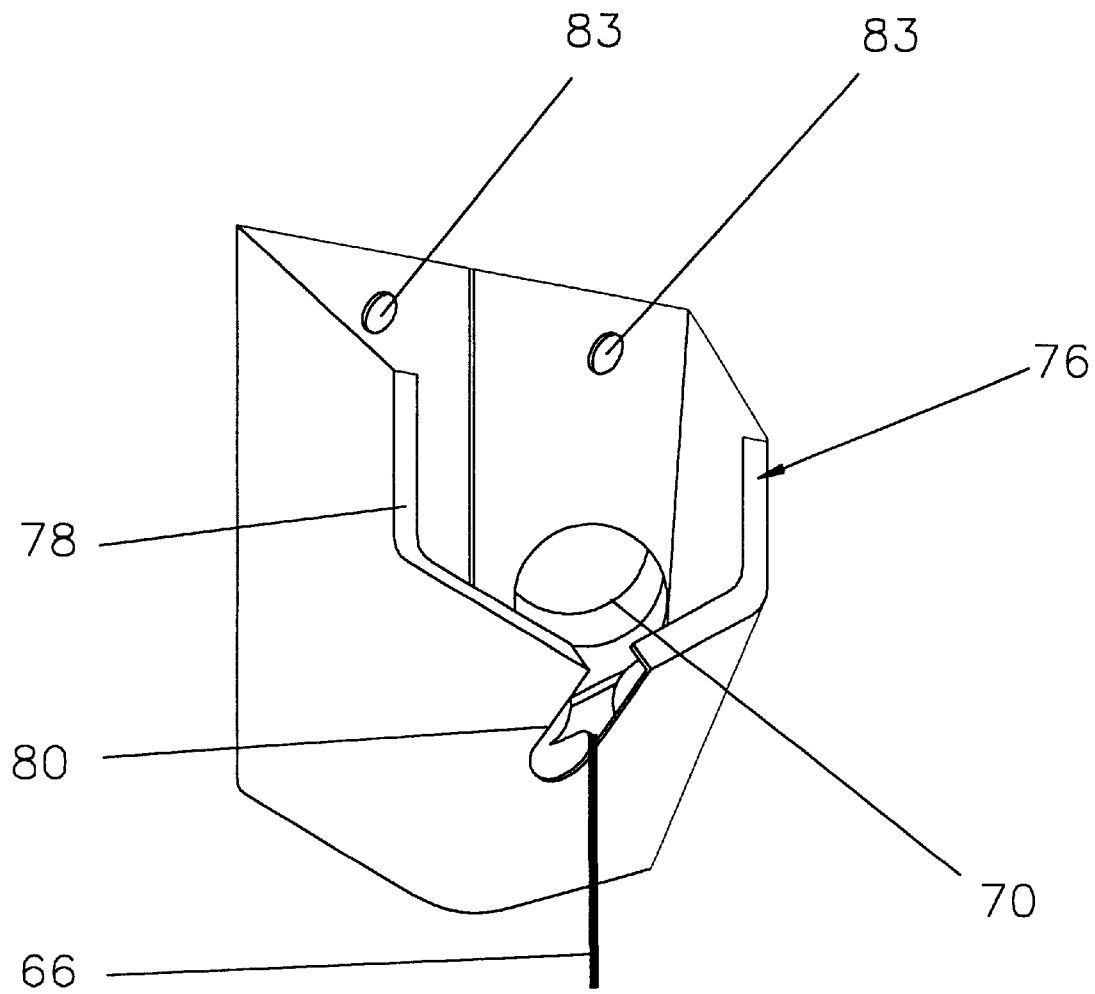
FIG. 5 is a perspective view of a bin for receiving lollipops in the preferred embodiment of the invention.
Figure 6:
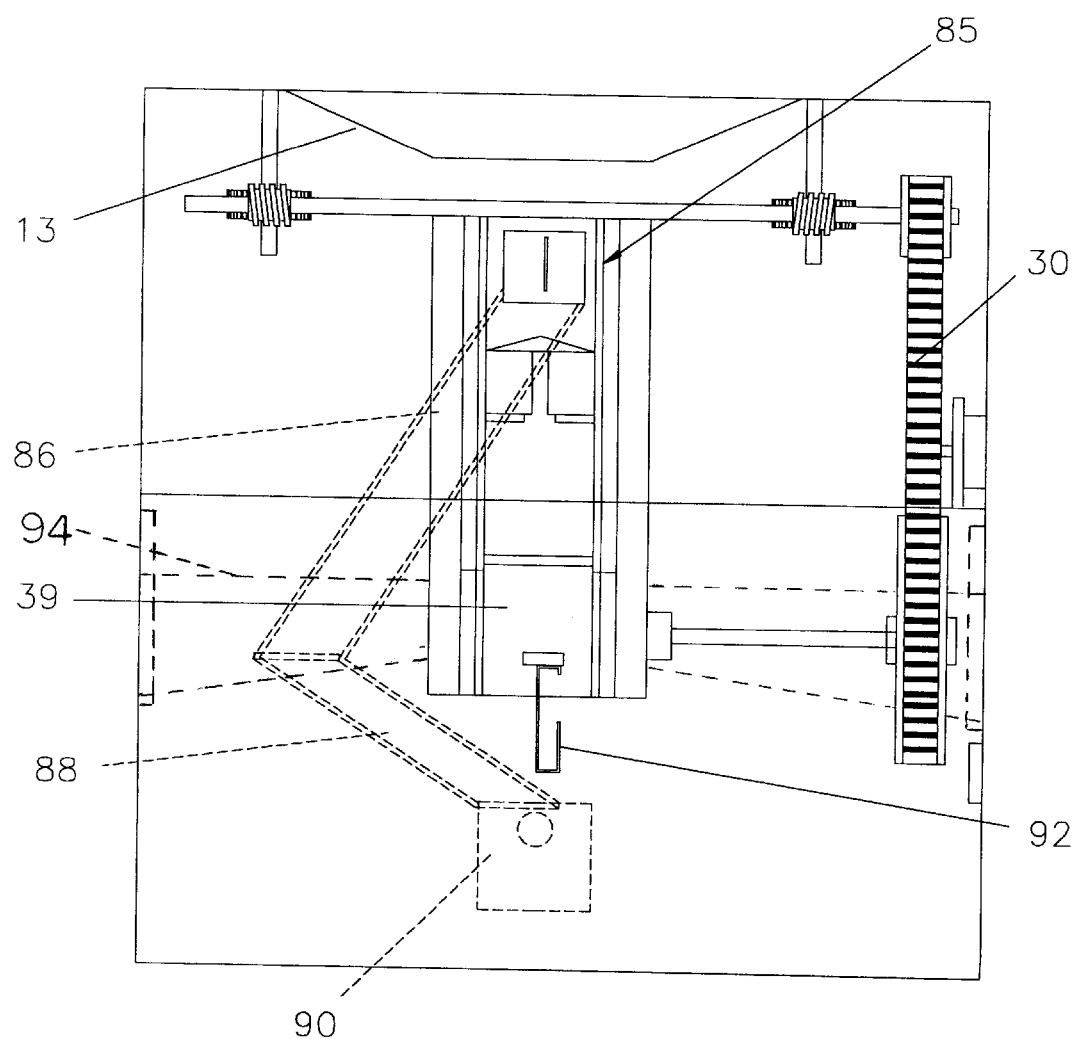
FIG. 6 is an enlarged sectional view of the coin mechanism assembly of the invention.

FIG. 4 illustrates a preferred embodiment of the invention wherein lollipops 16 are seen in tray 13 and single lollipops are seen in three baskets whose stems 66 extend through openings 67 in the bottom of their respective baskets, and a lollipop 70 at the top of the first chute mechanism that has just been ejected from its basket. A chute adjusting mechanism 72 and a cam lock 73 serve to hold the chute securely in an upright position during operation of the invention. FIG. 5 shows a bin 76 for receiving lollipops from exit drawer 38 which includes a container 78 having a slot 80 which receives the lollipop stick 66. A pair of bolt holes 83 are provided for securing the bin to housing 12, the bin not being shown in previous figures. FIG. 6 illustrates a coin collection assembly 85 which includes a conventional coin checking mechanism, not shown, a coin slide 86, and a collection tray 88 from which coins may be removed by opening a cash drawer 90. A chute support 92 and a housing support bracket 94 are shown schematically for purposes of explaining the operation of the invention and are conventionally used components in the dispensing system.

In operation, after a purchaser has inserted a coin into assembly 85 belt 30 is activated by the coin assembly and motor 51 is turned to advance one or more baskets, as appropriate, to the top of the chute and thereafter dump out the lollipops in these baskets as indicated by lollipop 70 in FIG. 4. If the proper coin or coins have been inserted, the lollipops will proceed along path 36 to exit 38 and thereafter into bin 76, shown in FIG. 5. The coins inserted into the coin assembly move down slide 86 into tray 88 where they may be collected by opening cash drawer 90.

Thus, a lollipop dispensing system and apparatus have been described which makes it possible to dispense oddly shaped objects such as lollipops on sticks to a viewing public. The basket and belt assembly provide an important advantage over existing vending machines since the product in applicant's invention can be bulk loaded thereby saving time and reducing the labor cost of servicing the dispensing machine. Another advantage of applicant's machine is its entertainment value in permitting a purchaser to see the product moving up and into position for sale. A further advantage of applicant's machine is that a chute is created when the drawer is opened, thus allowing for the money to be quickly and directly transported to a collection area.

Although this invention has been disclosed and described with reference to a preferred embodiment, its principles are susceptible to other applications which will be apparent to persons skilled in the art. For example, a zig-zag form of dispensing first chute without departure from the scope of the invention as set forth in the following claims.

What is claimed is:

1. A vending machine for vending lollipops dumped in bulk form from a source external to said machine comprising:

a housing and a lollipop dispensing means in said housing;

a receptacle in said lollipop dispensing means adapted to receive the lollipops dumped into said machine, said receptacle shaped to direct by gravity the lollipops dumped therein centrally in said housing;

a belt and a belt control means in said dispensing means for moving said belt in a substantially vertical loop in said housing;

a plurality of baskets in said housing, said baskets rotatably mounted and sequentially spaced on said belt, said baskets adapted to receive individual ones of said lollipops;

a helix means in said housing for moving individual ones of said lollipops into a position to be received into individual ones of said baskets, said belt positioned in said housing to receive said lollipops from said receptacle, said control means adapted to release individual lollipops from the respective baskets at the peak of the loop;

money collecting means in said housing for activating said control means upon the deposit in said money collecting means of a selected sum; and a lollipop collecting bin on said housing for presenting said lollipops to a purchaser.

2. The vending machine as defined in claim 1 and further including means in said dispensing means for diverting said lollipops to said receptacle so as to temporarily block dispensing of said lollipops upon the occurrence of selected monetary conditions.

3. The vending machine means as defined in claim 2, and a hand crank in said housing mechanically connected to said helix means for allowing a purchaser to control the movement of said helix means.

4. The vending machine as defined in claim 3 wherein said helix means includes at least two helixes disposed symmetrically in said lollipop dispensing means; and means connecting said helixes to said hand crank for rotating said helixes in opposite directions.

5. A system for dispensing oddly shaped objects/lollipops on sticks from a vending machine, said system comprising:

a housing and a dispensing means in said housing;

a tray in said dispensing means adapted to receive a plurality of said objects in bulk form and to direct said objects by gravity centrally in said housing;

a plurality of transport means in said dispensing means, said transport means adapted to receive said objects singly and to transport each object a selected distance above said tray, said transport means further adapted to release each of said objects singly at said selected distance above said tray including a belt and a plurality of baskets mounted thereon, said baskets being slotted, and having a conduit in said recovery means for receiving said objects and directing said objects to said exit means for retrieval;

intercepting means in said housing for intercepting objects under circumstances requiring retrieval of selected ones of said objects and adapted to return said objects to said tray, said tray including at least one helix disposed in said tray, means on said housing connected to said helix for drawing selected ones of said lollipops to respective ones of said baskets, a collecting means in said housing disposed at said exit means, said collecting means having a slot for deploying the sticks of said lollipops downward for the convenience of a purchaser, an object recovery means in said housing for receiving said released objects, said recovery means adapted to direct said released objects downward via gravity in said housing;

exit means in said housing connected to said object recovery means for deploying said released objects in an article to be recovered by a purchase thereof; and money collecting means in said housing adapted to allow operation of said transport means upon a selected sum of money being deposited therein.

\* \* \* \* \*